Sept. 9, 1958

B. M. TOBIN ET AL

2,851,660

CIRCUIT TESTING APPARATUS

Filed Oct. 26, 1953

INVENTORS
BERNARD M. TOBIN
MICHAEL J. KORMANSKI
BYRON L. HAVENS

BY Van Deventer & Shively
ATTORNEYS

Sept. 9, 1958　　　B. M. TOBIN ET AL　　　2,851,660
CIRCUIT TESTING APPARATUS

Filed Oct. 26, 1953　　　　　　　　　　9 Sheets-Sheet 5

INVENTORS
BERNARD M. TOBIN
MICHAEL J. KORMANSKI
BYRON L. HAVENS
BY Van Deventer & Shively.
ATTORNEYS United States Patent Office 2,851,660
Patented Sept. 9, 1958

2,851,660

CIRCUIT TESTING APPARATUS

Bernard M. Tobin, Fresh Meadows, and Michael J. Kormanski, Pearl River, N. Y., and Byron L. Havens, Closter, N. J., assignors to International Business Machines Corporation, a corporation of New York Application October 26, 1953, Serial No. 388,142

10 Claims. (Cl. 324—73)

The present invention pertains to improvements in circuit testing apparatus.

An object of the invention is to provide means for automatic checking of circuit networks for detection of faulty connections and short-circuits.

A further object is to provide apparatus of the above type adapted to check the basic wiring interconnections of complicated electrical devices prior to installation of the active components thereof.

Another object is to provide apparatus of the above type which automatically tests the various network connections in succession, and which, when a defect is encountered, automatically stops while indicating the nature and location of the defect.

A further object is to provide test apparatus of the above nature including a basic machine adapted to check different sizes and arrangements of circuit networks through the medium of interchangeable control boards.

A further object is to provide apparatus of the above type adapted to perform its automatic test cycle at high speed and to indicate the completion of the test.

A further object is the provision of apparatus adaptable to the testing of any type of circuit network wherein the terminals forming the network nodes are accessible.

Other objects and advantages of the invention will become evident during the course of the following description in connection with the accompanying drawings, in which.

Figure 2:
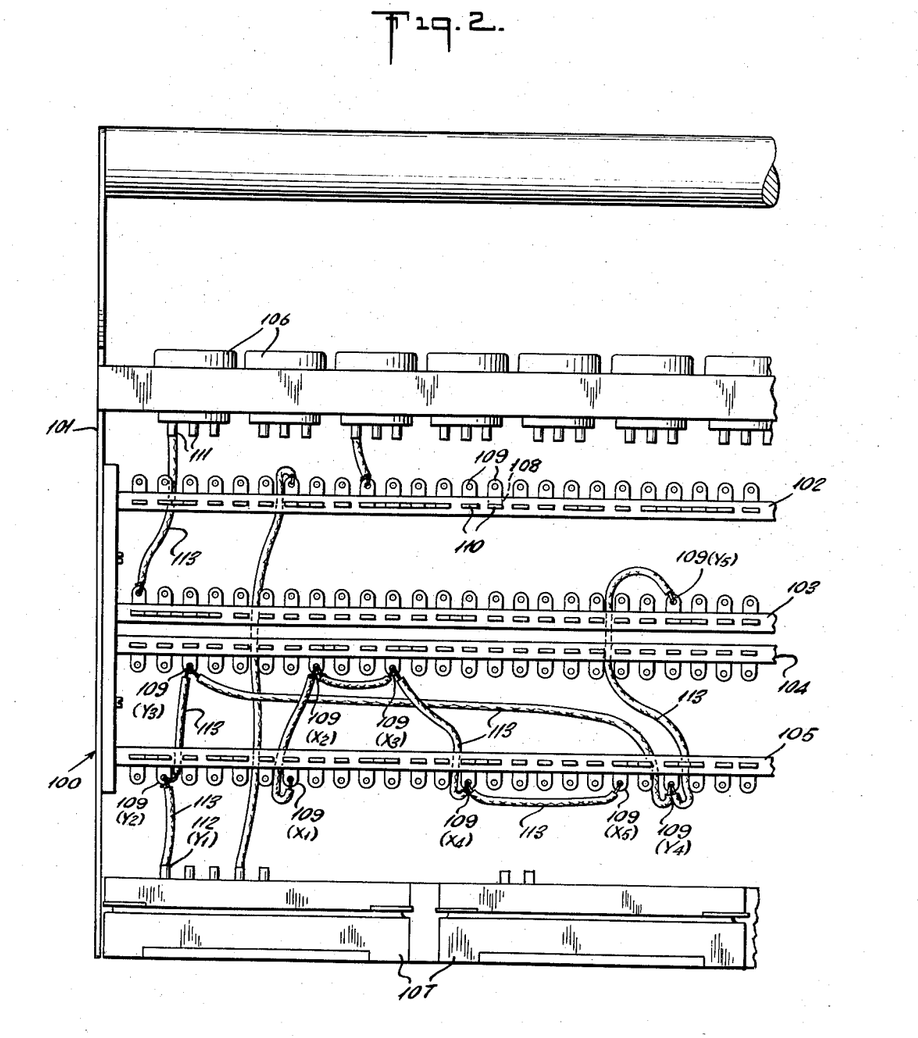
Figure 2 shows a form of chassis frame and wiring combination, used herein for illustrating typically the operation of the invention.
Figure 3:
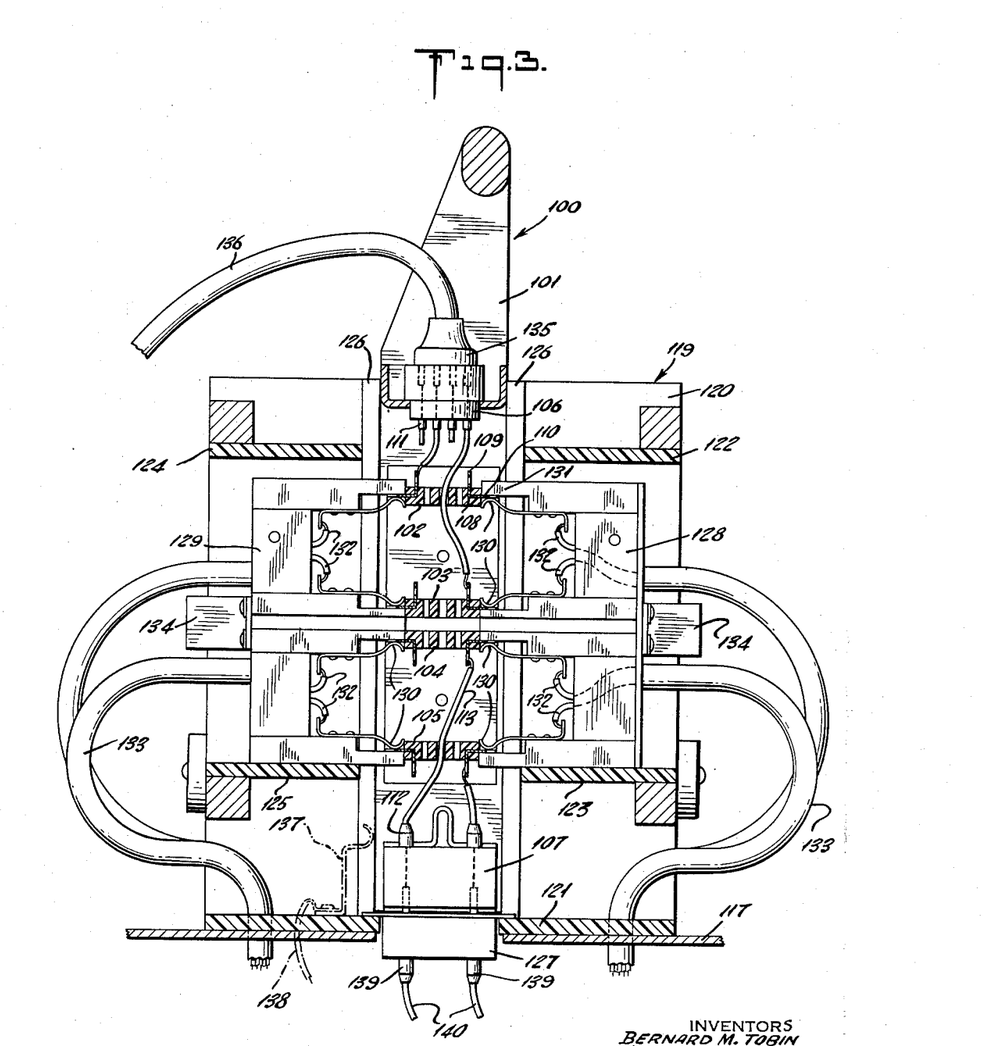
Figure 3 is a vertical sectional view of the chassis to be tested, installed in the receptor provided therefor.

In order to set forth most clearly the theory and operation of the testing apparatus, it is first convenient to examine a typical network structure to which the test procedure may be applied. Such a chassis structure appears in Figures 2 and 3, being generally designated by the numeral 100. Referring to Figures 2 and 3, it will be seen that the structure includes a frame 101 spanned by transverse insulating strips 102, 103, 104 and 105 and provided with a number of tube sockets 106 at the top and female pin connectors 107 at the bottom. Each insulating strip has embedded therein a plurality of electrodes 108, each electrode comprising a vertically directed lug 109 and an outwardly extending lug 110, as shown in Figure 2. This structure forms the basis of a pluggable unit which when completed contains a variety of tubes, resistors, condensers, etc. Such units produced in a plurality of standard widths and component combinations are used in various numbers and set-up arrangements in certain types of automatic computers.

The electrical combination in each pluggable unit is assembled in two stages. In the first stage pre-determined lugs 109, tube-socket terminals 111, and/or lower socket terminals 112, are connected by jumper wires such as 113 to form nodes, that is, electrically joined sub-combinations of electrodes to which the proper components are to be connected. In the second step, the components are inserted between the appropriate nodes. Many such units are highly complex, one form for example involving 13 vacuum tubes and 108 diodes, with as many as 630 lugs or plug terminals arranged in as many as 150 nodes. It will be evident that if testing were conducted after complete assembly, the detection and location of any defect in the complex jumper wiring network would entail a long and most difficult process. It is therefore highly advantageous to test the basic wiring network before installation of the active components. Here again, however, particularly when numbers of duplicate units are to be produced, the checking of all node connections by ordinary methods is obviously a long and laborious job, subject moreover to human error. By the means hereinafter described, such a unit can be tested in approximately four minutes, including the time necessary to install the unit in the testing machine, while the automatic operation eliminates the factor of human error.

It has been noted, as illustrated in Figure 3, that node connections may include tube-socket terminals (1) and/or lower socket terminals 112 as well as the lugs 109. Since all these junction devices enter into the tests in the same manner, for brevity and simplicity they may all be hereinafter referred to as junction electrodes.

Figure 9:
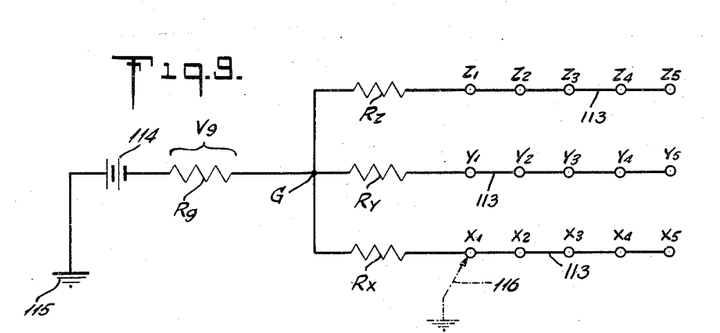
Figure 9 is an electrical diagram for use in explaining the basic theory of the invention.

The principles of operation of the device involve certain electrical relationships which may readily be shown by the simplified diagram, Figure 9. This figure shows three groups X, Y and Z of five lugs 109 each, these lugs for purposes of clarity being designated X1, X2, X3, X4 and X5 for the X-group, with similar Y and Z designations for the latter groups. The lugs of each group are all connected together by means of jumper wires 113. Three similar resistors $R_x$, $R_y$ and $R_z$ are connected between the X, Y and Z groups respectively and a common junction point G. The point G is connected through a resistance $R_g$ to a source 114 of D. C. current, thence to ground 115.

With the above connection, consider a test procedure which applies a ground connector 116 to point X1 and simultaneously measures the resistance to ground of points X2, X3, X4 and X5. An erroneous open circuit between X1 and any of the points X2, X3, X4 and X5 will thereby be revealed. At the same time, with point X1 grounded, a current will flow through the resistor $R_x$ and the resistor $R_g$ in series. If neither point Y1 or Z1 is grounded, and assuming the voltage of the current source 114 to be 330 volts, the current I will be $$I = \frac{330}{R_x + R_g} \tag{1}$$

and the voltage drop across resistor $R_g$ will be $$V_g = \frac{R_g(330)}{R_x + R_g} \qquad (2)$$

If, however, a short circuit exists between point X1 and a point of either other group, for example point Y1, the test current will flow through equal resistors $R_x$ and $R_y$ in parallel, and the consequent voltage drop across $R_g$ will be greater than before, that is, $$V_g = \frac{R_g(330)}{R_g + (.5)R_x} \qquad (3)$$

Thus, if a measure be established of the voltage drop $V_g$, the higher value of Equation 3 will indicate a short circuit from point X1 to either the Y or Z group, while the lower $V_g$ of Equation 2 will indicate that no such short circuit exists.

In the foregoing manner, either an open circuit among the points of group X or a short-circuit of any point in group X to points Y1 and Z1 may be detected.

Figure 1:
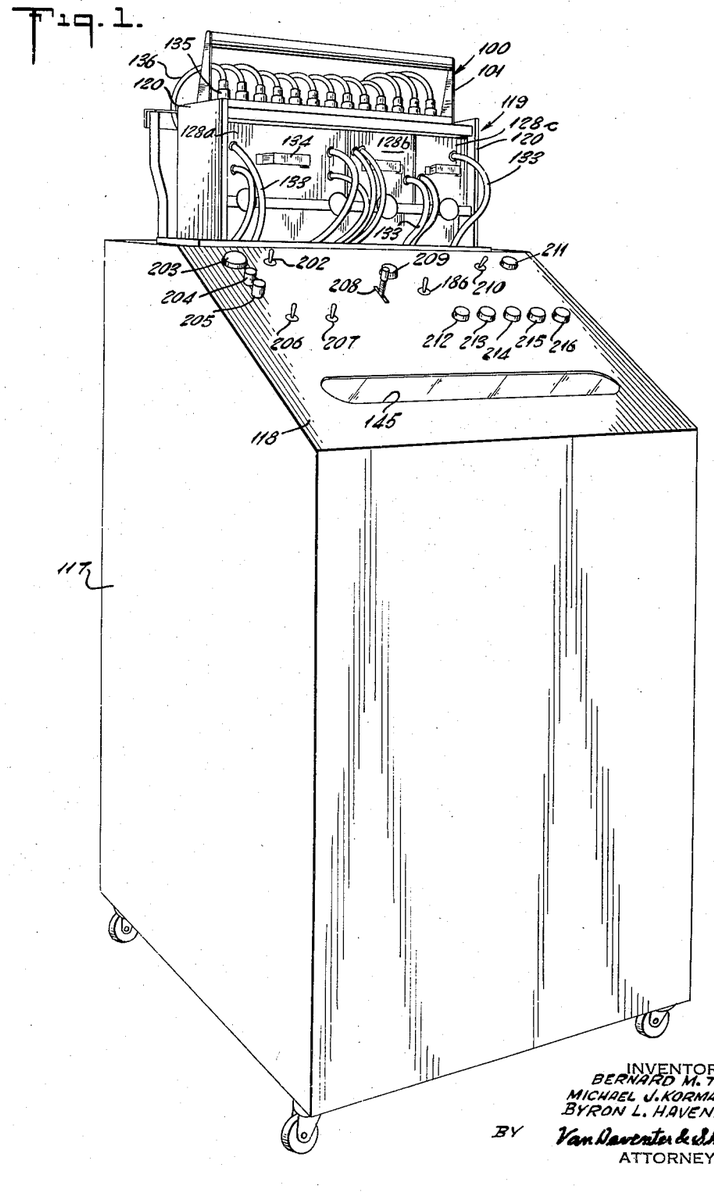
Figure 1 is a perspective front and right side view of a preferred form of the invention.

The invention provides the following means for applying the above principles in automatically checking all connections of each group or node both for improper open or for short-circuits, and indicating the nature and location of any such defect:

Referring to Figure 1, the numeral 117 indicates a cabinet having a forwardly inclined upper operating panel 118. Mounted on the top of the cabinet 117 rearwardly of the panel 118 is a receptor 119 for removably holding the pluggable unit frame 101 in the machine and for establishing the requisite electrical test connections to the unit's network.

Referring again to Figure 3, the receptor 119 comprises insulating end plates 120 and an insulating bottom plate 121 secured to the top of the cabinet 117. Upper and lower transverse insulating plates 122 and 123 are secured between the end plates 120 in the front portion of the receptor. Similar upper and lower insulating plates 124 and 125 are disposed in the rear side of the receptor, the rear and front plates being spaced to permit the frame 101 to be inserted downward between them, narrow insulating rails 126 being provided on the end plates 120 to guide the frame in central position. Male gang plugs 127, secured to the bottom plate 121, are adapted to receive the bottom female gang connectors 107 of the pluggable unit.

Large gang connectors 128 and 129, slidable inwardly and outwardly on the front and rear plates, are each equipped with four rows of resilient contact leaves or springs 130 adapted individually to engage the various horizontal lugs 110 of the pluggable unit. When in operating position as shown in Figure 3, the lugs 110 are gripped between the contact springs 130 and rigid insulating backing rails 131, thus ensuring good electrical contact. Each spring 130 has attached thereto an insulated wire 132, these wires from the various springs being combined in flexible cables 133 looped outward and downward through the bottom plate 121 into the interior of the cabinet 117. The flexibility of the cables 133 permits the gang connectors 128 and 129 to be readily moved inward and withdrawn by means of handles 134. While the connectors 128 and 129 may obviously each be constructed as a single unit extending entirely across the receptor frame, they are preferably made in multiple units such as 128a, 128b, and 128c as shown in Figure 1, for easy manipulation and to facilitate adaption to testing chassis networks of various widths. It will be understood that the connectors 128 and 129 collectively provide individual connections from all the lugs 110 of the unit chassis 100 via cables 133 to the related elements of the machine hereinafter described.

Similar individual connections from the upper tube-socket electrodes 111 are provided through multi-prong plugs 135 and attached cables 136. A spring contact 137 attached to a lead-wire 138, engages the metal frame 101 of the pluggable unit chassis 100, in order to permit testing for short-circuits between any of the network elements and the frame, in the same manner as in case of shorts between network nodes themselves.

The terminals 139 of the bottom plugs 127 are similarly attached to wires 140 leading downward within the cabinet 117, thus completing the combination by which the receptor 119 provides test connections to all the junction electrodes of the chassis 100 as well as the frame 101.

Figure 4:
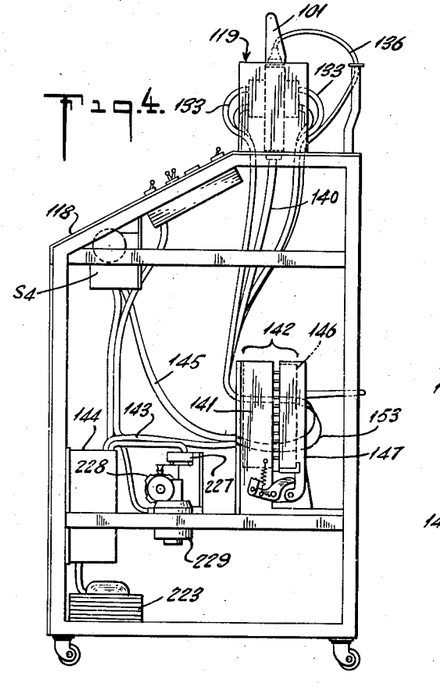
Figure 4 is a left side elevation with the side panel removed to show the general relationship of the internal parts.

Returning to Figure 4, it will be seen that all the described leads from the receptor 119 are connected into the stationary contact board 141 of a control panel 142. From the stationary contact board 141 a set of wires 143 runs into box 144 containing various relays and the like hereinafter shown and described in connection with the wiring diagrams, Figures 10, 11 and 12.

Other wiring groups 145 provide permanent connections from the stationary board 141 to other operating elements hereinafter described.

The control panel 142 also includes a removable plug-board 146 normally clamped in operative engagement with the stationary board 141 by a suitable supporting cradle 147, preferably of a type such as that disclosed in Patent No. 2,111,118.

Figure 5:
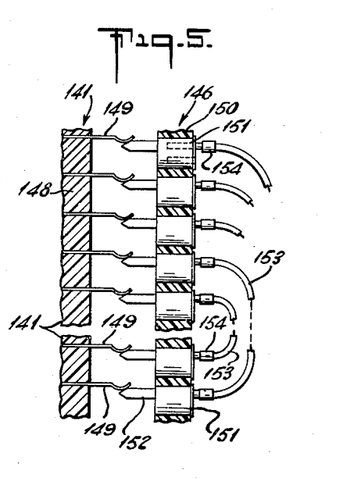
Figure 5 is a fragmental detail view of the control board contact means.

The electrical relationship between the stationary board 141 and the plug-board 146 is illustrated in Figure 5. The stationary board 141 includes an insulating member 148 holding a plurality of spring contact fingers 149 sufficient in number to provide individual connections to all te previously described conductors leading from the receptor 119 and also all the wires of groups 143 and 145. The removable plug-board 146 also includes an insulating plate 150 holding a plurality of pin jacks 151 having tapered extensions 152 adapted to make individual electrical contacts with the spring fingers 149. The jacks are provided with double sockets to allow for multiple connections thereto. Flexible plug-wires 153 are equipped with end pins 154 adapted to be plugged into the jacks 151 for selectively effecting connections between the receptor wiring and the related internal wiring of the machine via the spring fingers 149.

In practice, when a number of identical networks are to be tested, a plug-board 146 is wired to provide the proper connections therefor. Similarly, when other types of networks are to be tested, a plug-board 146 is wired for each type. Thereafter, when a run of any particular type of identical networks is to be tested, it is necessary only to install the corresponding pre-wired plug-board 146 to set up the machine in proper combination.

Figure 7:
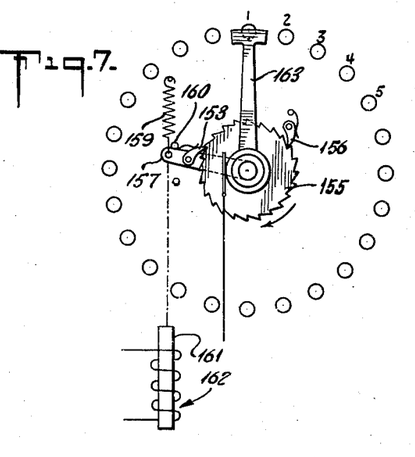
Figure 7 is a diagrammatic illustration of a type of rotary stepping switch suitable for use in the device.
Figure 8:
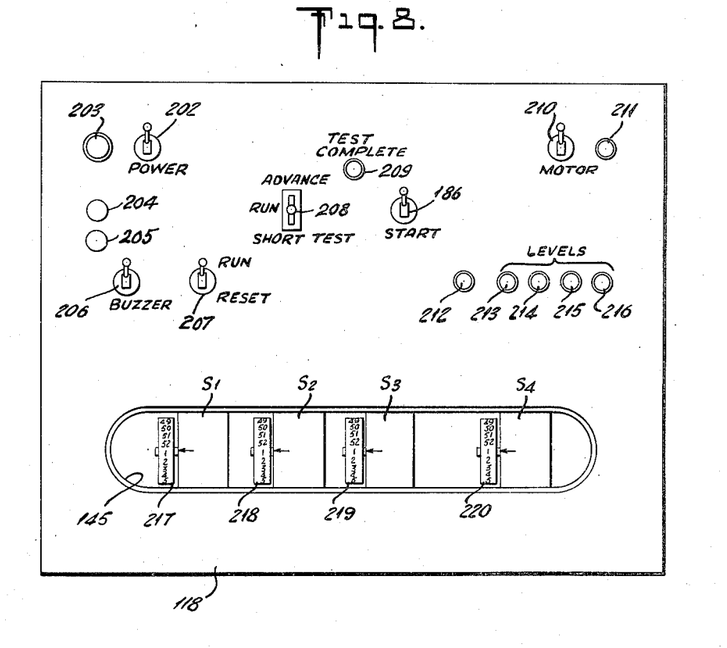
Figure 8 is an enlarged view of the operating panel and related elements.

The operating panel 118, Figure 8, has near the front edge thereof an elongated window under which are secured four rotary magnetic stepping switches S-1, S-2, S-3 and S-4 each having five levels. As such switches per se are well known in the art, description herein is properly limited to, the semi-diagrammatic illustration, Figure 7, and to the related showings in the circuit diagrams.

In Figure 7, the numeral 155 indicates a ratchet provided with a spring-pressed holding pawl 156 which will permit only clock-wise rotation. A swinging arm 157 carries a second or driving pawl 158 also engaging the ratchet 155. The arm 157 is normally held clock-wise against a stop 160 by a spring 159. The arm 157 is also linked to the plunger 161 of a solenoid 162.

When the solenoid 162 is energized the plunger 161 rocks the arm 157 downward, "cocking" the spring 159, so that when the solenoid is de-energized the spring retracts the arm, causing the pawl 158 to advance the ratchet 155 clockwise by one tooth. A wiper switch arm 163, operatively attached to the ratchet 155, is adapted to make contact successively with a circular row of contact points 1, 2, 3, etc., corresponding in number to the teeth on the ratchet. It is evident that by successive current impulses applied to the solenoid 162 the wiper 163 may be made to form contact with all the points in sequence, returning to its initial contact 1 at the completion of a 360 degree cycle.

Figure 10:
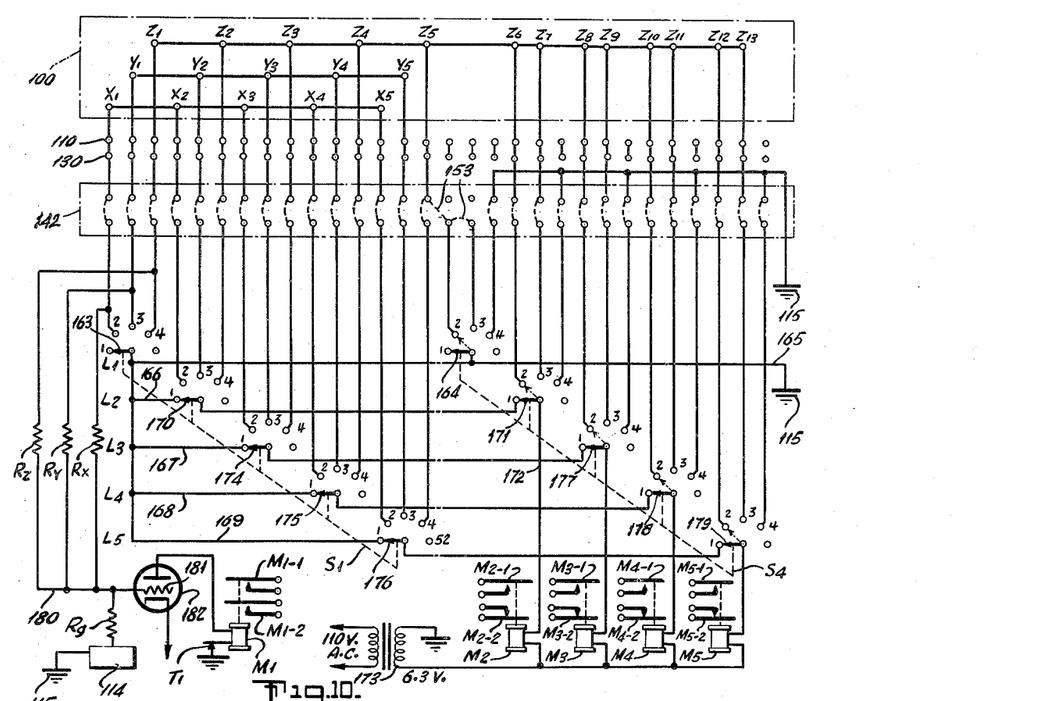
Figure 10 is a simplified partial circuit diagram illustrating the test circuits per se.
Figure 11:
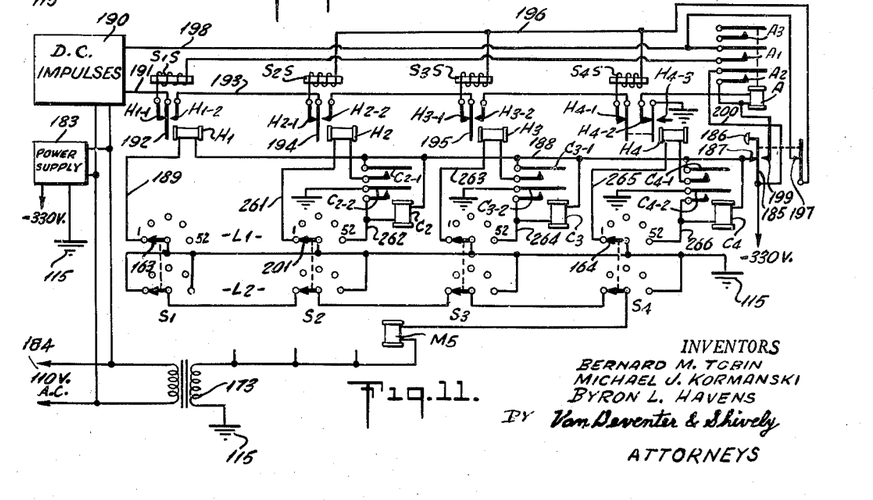
Figure 11 is a similar diagram showing the automatic cycling elements of the machine, and Figures 12A, 12B and 12C together form a complete circuit schematic diagram of the basic machine.
Figure 12A:
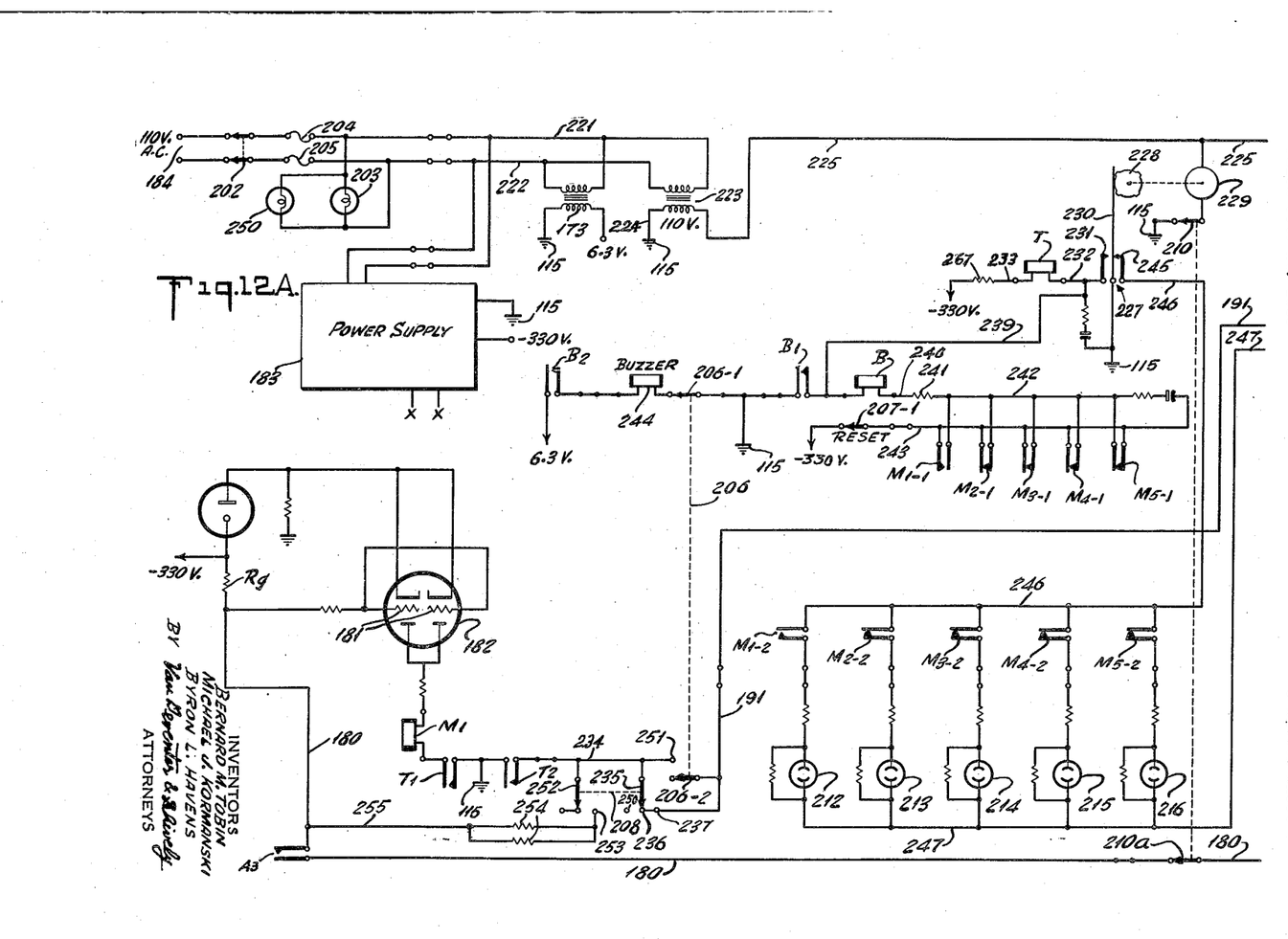
Figure 12B:
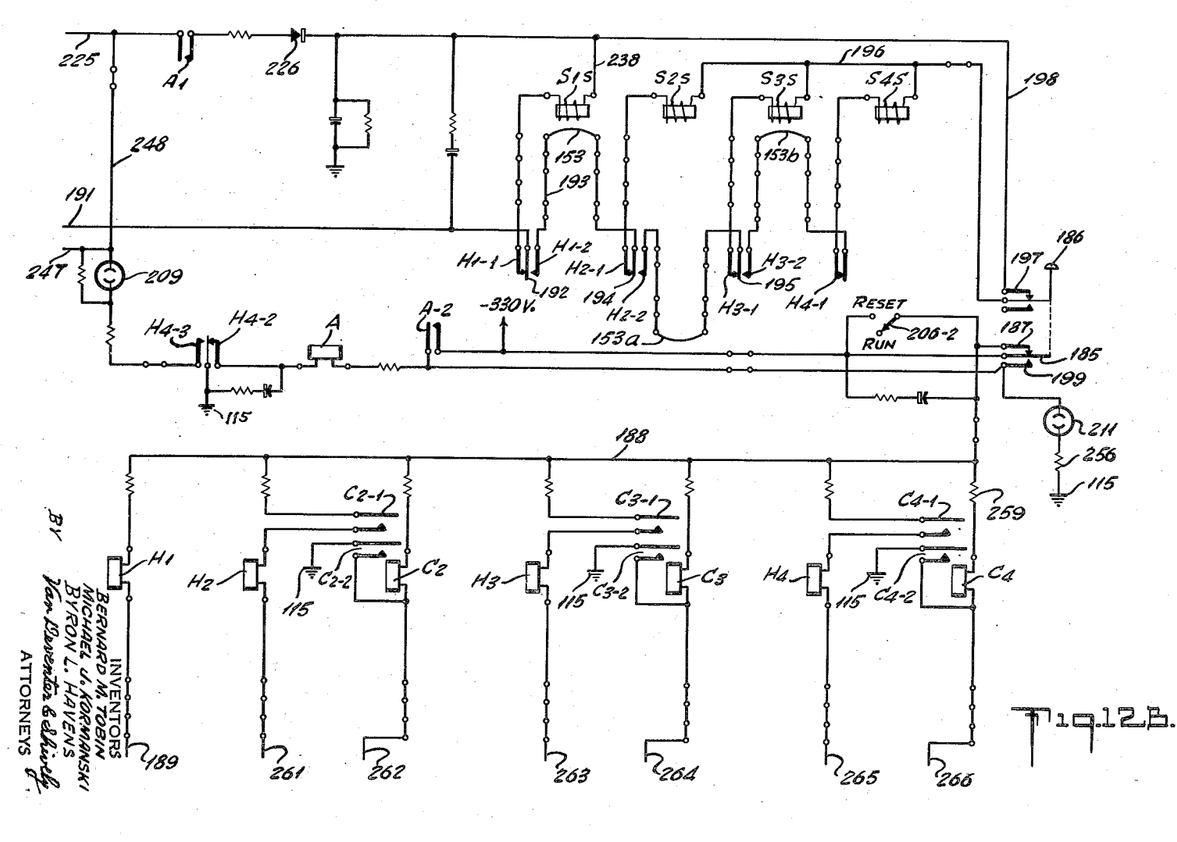
Figure 12C:
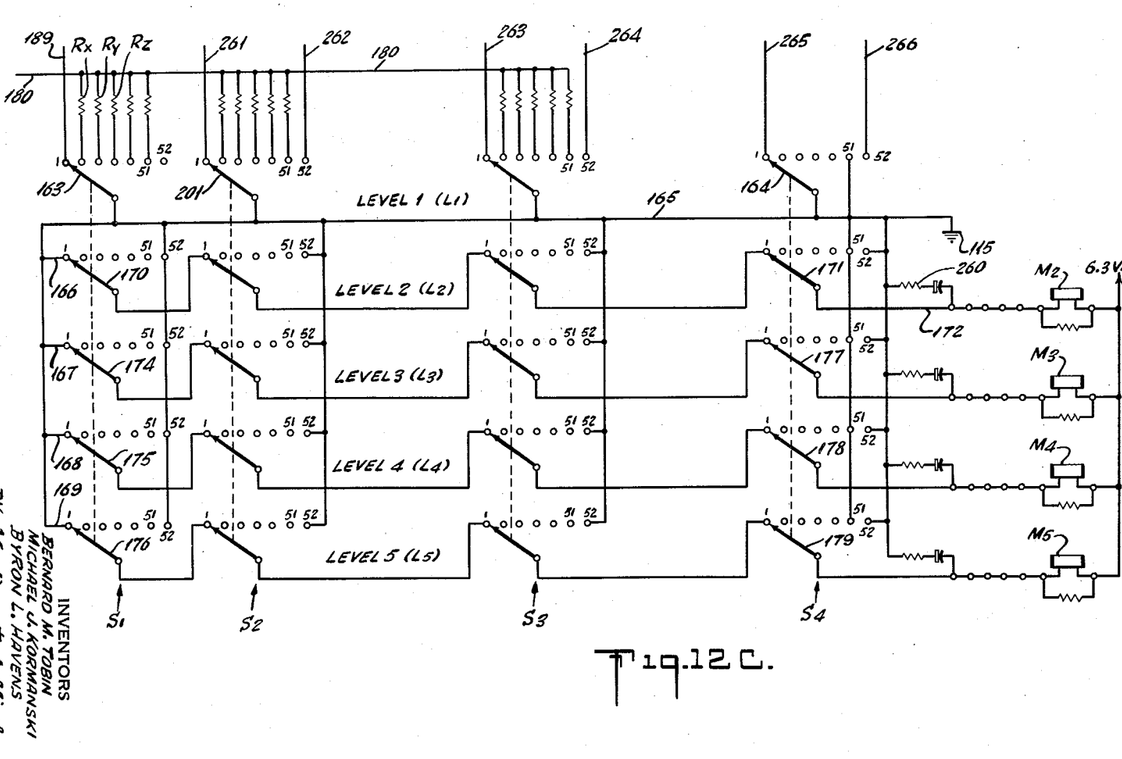

For purposes of clarity and minimum wiring complication in diagrammatic Figures 10, 11 and 12C, in accordance with standard practice the points of the various stepping switches are arranged in arcs or straight lines, but it will be understood that their operation in each case represents a unidirectional cycle as illustrated by Figure 7, i. e., the wipers pass directly from the last to the first contact point by completion of the 360 degree cycle, without reverse engagement of the intermediate points.

The circuit combination of the present invention falls into two principal sub-divisions; first, the portion comprising the test circuits per se, and secondly the means by which the successive test circuits are set up in an automatic cycle. While, as shown in connection with Figures 12A, 12B, and 12C, the two circuit divisions are operatively inter-connected, explanation of the two can be carried out most clearly by first considering the test and cyclic functions separately by means of simplified Figure 10 and Figure 11 respectively.

Figure 10 shows the manner in which the stepping switches S1 etc., set up the test circuits of Figure 9. In the typical form of the invention described herein these switches include fifty-two points on each of the levels L1, L2, L3, L4 and L5, but as the functions of all points between first points 1 and last points 52 are identical, points 2, 3 and 4 are shown as illustrative of all such intermediate points. Similarly, as the first three stepping switches S1, S2 and S3 are the same in test function, the first switch S1 is shown as typical of all three. Stepping switch S4 is included because it is co-operative with any of the others for completing tests of network nodes having more than five levels or junction electrodes, as hereinafter explained.

The L1 wiper contact arm 163 of stepping switch S1 and the similar L1 arm 164 of stepping switch S4 are connected via a conductor 165 to ground 115, to which ground points 1 of levels L2, L3, L4 and L5 of switch S1 are also connected by means of branches 166, 167, 168 and 169. The L2 wiper 170 of switch S1 is connected to point 1 of the second level L2 of switch S4. The wiper arm 171 of S4 switch level 2 is connected via a conductor 172 to the coil of a relay M2 connected in turn to one side of a 6.3 volt transformer winding 173, the other side of the winding running to ground 115.

Similarly, L3, L4 and L5 wipers 174, 175 and 176 of switch S1 are connected to points 1 of the corresponding levels in switch S4, while the latter's corresponding wiper arms 177, 178 and 179 are electrically joined to relays M3, M4 and M5, thence to the transformer 173. It will be evident from the above described connections, that so long as the wiper arms of both stepping switches engage their corresponding contact points 1 as shown, the relays M2, M3, M4 and M5 are energized. Each of these relays is provided with a normally open and a normally closed contact pair. To avoid undue multiplicity of index numbers and to facilitate identification in Figures 12A, 12B and 12C, these contacts are referred to by the index number of their respective relays followed by the numeral 1 for the open contact and 2 for the closed contact; for example contacts M2–1 and M2–2 indicate respectively the open and closed contacts of relay M2.

When the machine is set up for testing the network of a unit 100 is indicated, the points 2 of the five levels of switch S1 are connected via the control panel 142 and the previously described receptor contacts to the connected network junction electrodes X1, X2, X3, X4 and X5 forming an X-group or node illustrated in Figure 9. Similarly, the points 3 of switch S1 are connected respectively to the electrodes Y1, Y2, Y3, Y4 and Y5 of the Y-node, while points 4 of switch S1 are connected to the electrodes Z1, Z2, Z3, Z4 and Z5 of the Z-node.

It will be noted in this case however, that the Z-node has thirteen connected junction electrodes while the switch S1 has only five levels as noted above. Provision for testing these additional junctions is made by means of the switch S4. For this purpose the L1 points 2 and 3 of switch 4 are joined to the Z5 electrode by means of plug-board wires 153. In switch S4 points 2 and 3 of level L2 are connected respectively to junction electrodes Z6 and Z7, L3 points 2 and 3 to electrodes Z8 and Z9, L4 points 2 and 3 to Z10 and Z11, L5 points 2 and 3 to Z12 and Z13. All points 4 of switch S4 are connected via the control panel 142 to ground 115, for a purpose hereinafter explained.

The L1 points 2, 3 and 4 of switch S1 are also connected respectively through equal resistors $R_x$, $R_y$, $R_z$ and a common conductor 180 to the common resistor $R_g$ and current source 114, thence to ground 114, thus establishing the general short-circuit testing arrangement of Figure 9.

The grid 181 of a vacuum tube 182 is connected to the common conductor 180.

A relay M1 is connected in the plate circuit of the tube 182, current for this circuit being furnished by means shown in Figure 12A. The relay M1 is provided with two normally open contacts M1–1 and M1–2 which, in common with the contacts of relays M2, M3, M4 and M5, are utilized for various signalling and control operations also hereinafter explained in connection with Figures 12A, 12B and 12C.

At the start of a test, all switch wipers initially rest on their number 1 contacts as shown, so that when the operating current is applied to the system the relays M2, M3, M4 and M5 are energized, as previously noted. In the first test operation the switch S1 is advanced one step, shifting all its wiper arms to the corresponding number 2 contact points. This connects the network junction electrode X1 to ground 115 through the wiper arm 163 and causes current to flow in series through the resistors $R_x$ and $R_g$ as in Figure 9, so that if no short-circuit exists between electrode X1 and either the Y or Z nodes the voltage drop $V_g$ across $R_g$ assumes the value of Equation 2, and the grid 181 of the tube 182 is correspondingly influenced by the potential of the common conductor 180.

The tube 182 is so biassed, as indicated in Figure 12A, that it is non-conducting when $V_g$ has the value of Equation 2 but becomes conducting if $V_g$ changes to the value of Equation 3. If, therefore, a short-circuit exists between X1 and either the Y or Z node, plate current flows through the tube, energizing the relay M1, which closes the contacts M1–1, and M1–2 to actuate indicating and stop means hereinafter described. Thus it will be seen that the combination shown provides automatic means for detecting short-circuits.

As the second, third, fourth and fifth level wiper arms 170, 174, 175 and 176 rest on their respective points 2, they are no longer directly grounded as was the case in their point 1 position. However, if no open circuit condition exists between the electrode X1 and any of the remaining X-node electrodes, arms 170, 174, 175 and 176 are connected through the node itself and the L1 arm 163 to ground 115, so that the relays M2, M3, M4 and M5 remain energized. However, if an open condition exists for example between electrodes X1 and X2, arms 170, 174, 175 and 176 are robbed of their ground connection, with the result that relays M2, M3, M4 and M5 drop out. On the other hand, if the break exists only between electrodes X3 and X4, relays M2 and M3 remain energized, but, relays M4 and M5 drop out. If the break is between X4 and X5, only relay M5 drops out. It will thus be evident that the relay or combination of relays dropping out affords an indication both of the existence of an open circuit condition and of its location in the node being tested.

The first or X-node having been tested for short-circuits and open conditions as described, the stepping switch S1 is advanced to the number 3 contact position, causing the Y-node to be tested in the same manner. The wiper arms of the stepping switches are of the bridging type as indicated in Figure 7, so that during advance from one point to the next contact is made with the second point before it is broken with the first. By this means the M relays are prevented from dropping out and thereby giving false indications of network open connections during the switch advance. However, the bridging action momentarily connects two nodes together during the advance, and to prevent false indication of a short-circuit by the relay M1, a contact T1 is included in the relay's actuating circuit, this contact being actuated by timing means hereinafter described, to disable the relay M1 while the switch advance takes place.

Continuing the operation, the stepping switch S1 continues to advance to successive point contact positions, testing the successive nodes connected to the respective points in the manner described. While for illustration only three nodes X, Y and Z are depicted, it will be understood that in practice the stepping switches are provided with as many points as desired. In the embodiment generally described herein each stepping switch has fifty-two points on each level, so that the points 2, 3 and 4 illustrated are representative of all points intermediate points 1 and 52. The latter two points are reserved for commutation in the automatic cycle to be described in connection with Figure 11. Thus each stepping switch provides fifty point positions available for testing network nodes, i. e., switches S1, S2 and S3 together have a capacity of 150 nodes in a single network.

Hitherto the description has dealt with nodes of not more than five junction electrodes, allowing the five levels of a single stepping switch to complete the test of all five junctions. Many networks, however, contain nodes having more electrodes than the number of switch levels available. For example, in Figure 10 the Z-node is illustrated as having 13 electrodes. To meet this condition the fourth stepping switch S4 is employed as follows, it being noted that the switch S4 is not directly equipped with resistors such as $R_x$:

Switch S1 in completing its 360 degree cycle to arrive again at number 1 contact position as shown, has already tested electrodes Z1, Z2, Z3, Z4 and Z5. Points 2 and 3 of level 1 on switch S4 have been connected to Z5 by plug-wires 153, as previously noted. Thus when L1 wiper 164 of switch S4 advances to point 2 it again grounds the Z-node.

At the same time contact points 2 of levels L2, L3, L4 and L5 test their connected junction electrodes Z6, Z8, Z10 and Z12, the relays M2, M3, M4 and M5 remaining energized provided no improper open circuit exists between any of these four junctions and Z5. Similarly, as the switch S4 advances to the point 3 contact position the connected junctions Z7, Z9, Z11 and Z13 are tested, completing the test of the Z node. As in the operation of switch S1, any open connection between junctions of the node causes the appropriate M-relay or relays to drop out.

It has been previously pointed out that the number 4 contacts points of switch S4, which have no connections to the particular unit 100 under test, instead are grounded through the control panel 142. This is illustrative of the fact that the stepping switch combination, which is built for testing networks of various sizes and complexities, usually provides more contacts than are required by the particular network under test; the excess contact points are grounded to prevent false drop-out of the M-relays as the automatic cycle progresses.

To set forth the means by which the automatic cycle is carried out, reference is made to Figure 11, wherein the respective solenoids of stepping switches S1, S2, S3, and S4 are designated S1S, S2S, S3S and S4S for easy identification with their respective switches. The numeral 183 designates a power unit of well-known type which is connected to an A.-C. supply line 184, and in turn supplies the machine with suitable operating voltage, herein taken as −330 volts to ground 115. The central pole 185 of a double-throw momentary contact starting switch 186 is connected to the −330 volt supply, and normally engages a contact 187 connected to a conductor 188.

The level 1 contact point 1 of stepping switch S1 is connected via a lead 189 to the coil of a single-pole double-throw relay H1, the other side of the relay coil being connected directly to the conductor 188. The L1 contact number 1 of switch S2 is connected to a similar single-pole double-throw relay H2, but the connection from the latter to the conductor 188 includes a normally open contact C2–1 of a relay C2, the latter's coil being connected directly between the conductor 188 and the last L1 contact point 52 of stepping switch S2. A second normally open contact C2–2 of relay C2 is adapted when closed to effect a holding connection to ground as hereinafter set forth. It is evident from the above description that relay H2 can be energized only by closure of relay C2, which latter can only be affected through L1 contact point 52 of the stepping switch S2.

The switches S3 and S4 are similarly related to relays H3 and H4 controllable via commutating relays C3 and C4 from the level 1 number 52 contact points of their respective switches in the same manner as described with respect to switch S2.

The numeral 190 generally indicates a source of "square wave" direct current impulses. One output conductor 191 of the source 190 leads to the common contact member 192 of the holding relay H1, thence through the latter's normally closed contact H1–1 to the number one switch solenoid S1S. The normally open contact H1–2 is connected via wire 193 to the common contact member 194 of relay H2, the latter's normally closed contact H2–1 leading to the second switch solenoid S2S. Similarly, the normally open contact H2–2 is connected to the common contact member 195 of relay H3 and thence via the latter's normally closed contact H3–1 to the third switch solenoid S3S, while the normally open contact H3–2 is connected via a normally closed contact H4–1 of relay H4 to the fourth switch solenoid S4S. Means to establish a common current return path for solenoids S2S, S3S and S4S is provided through a conductor 196, a normally closed contact 197 of the starting switch 186, and a conductor 198, to the impulse source 190. The solenoid S1S has a return path through a normally open contact A1 of a three-pole relay A, and the conductor 198.

The relay A, which may properly be termed the master relay, has one coil connected through a second normally closed contact H4–2 of relay H4 to ground, while an initial −330 volt coil connection is adapted to be made through a normally open contact 199 and the starting switch pole 185. A second normally open contact A–2 is adapted to establish a holding connection for relay A via a jumper 200 around the starting switch contact 199.

The cyclic operation is as follows:

Current is first turned on the device to energize the power unit 183 and D. C. impulse source 190. To start the cycle, the starting switch 186 is actuated, throwing in the relay A which locks in by its previously described holding contact A–2. At the same time, actuation of the starting switch breaks the contact 187 to conductor 188, ensuring that all the H and C relays (which may have remained closed from a previous test cycle) are dropped out. Solenoid S1S thereupon receives D. C. impulses through contact A–1 of relay A, stepping the switch S1 forward to establish the successive test connections previously described. As soon as the stepping action has started the starting switch 186 may be released, but since the wiper arm 163 has disengaged its number 1 contact point, the relay H1 remains de-energized with its contact H1–1 closed, so that the solenoid S1S continues the successive advance of switch S1.

When the stepping switch S1 completes its 360 degrees cyclic advance the wiper 163 re-engages its contact point 1, thereby completing the circuit through relay H1. Thereupon the latter's common electrode 192 transfers the impulse current from solenoid S1S to solenoid S2S via contacts H1–2 and H2–1, relay H2 remaining de-energized due to open contact C2–1. Switch S1 thereby is retained in initial position, while the solenoid S2S steps the switch S2 forward through its cycle.

When the L1 wiper 201 of the second stepping switch S2 reaches its final contact point 52 the commutation relay C2 is energized, locking in by means of the holding contact C2–2 and closing the contact C2–1. Thereafter, as wiper 201 completes its 360 degree cycle and re-engages its contact point 1 it energizes relay H2, transferring the "square wave" D. C. impulse current from solenoid S2S to the third solenoid S3S, which latter thereupon steps the switch S3 through its test cycle.

In the same manner, as switch S3 completes its rotary cycle the relays C3 and H3 are closed, transferring the stepping current to the solenoid S4S and thereby carrying the fourth stepping switch S4 through its rotary cycle to complete the test. When the L1 wiper 164 traverses its point 52 and re-engages its point 1, relays C4 and H4 are closed. The opening of contact H4–1 removes the impulse current from the solenoid S4S to stop its stepping action; while the breaking of contact H4–2 drops out the master relay A. At the same time a normally open third contact H4–3 of relay H4 completes a ground connection to signal the completion of the test by means shown in Figure 12B and hereafter explained. Thus at the completion of the automatic cycle the mechanism comes to rest with all the holding or H relays and the commutating or C relays locked in.

The manner in which the operation of the foregoing separately described test and actuation cycles are combined, together with the accompanying signalling or manual control devices, will now be set forth by reference to Figures 12A, 12B and 12C in conjunction with Figure 8. Referring first to Figure 8, the operating panel 118 supports a main power switch 202 provided with a signal lamp 203, two fuses 204 and 205, a buzzer switch 206, a reset switch 207, a three position double-pole switch 208, a test completion indicating lamp 209, the starting switch 186, a motor switch 210, a voltage indicating lamp 211, a short-circuit indicating lamp 212, and four switch-level indicating lamps 213, 214, 215, and 216. The stepping switches S1, S2, S3 and S4 are provided with rotary drum dials 217, 218, 219 and 220 respectively, which serve to indicate the contact positions of the respective switch wiper combinations.

In Figures 12A, 12B and 12C, in accordance with standard modern commercial drawing practice, certain relay contacts are depicted and indicated in their functional circuit positions rather than in direct physical juxtaposition with their related relay magnets, in order to avoid what would otherwise be an unnecessarily confusing multiplicity of lines and cross-overs. The same technique has been applied to the poles of double-pole switches for the same reason. In each such case the related parts are plainly identified with each other by their index numbers, and it will be understood that their actual physical relationships are of the usual kind typically shown in Figures 10 and 11.

Referring to Figure 12A, it will be seen that the 110 volt A. C. current supply 184 is led into the machine through the power switch 202 and the two fuses 204 and 205, thence via conductors 221 and 222 to an isolation transformer 223. One secondary lead 224 of the transformer 223 is connected to the internal ground 115 of the machine, while the other secondary lead 225 is adapted to effect a connection via the contact A1 of relay A to a rectifier 226, Figure 12B, this rectifier forming part of the D. C. impulse source generally denoted 190 in simplified Figure 11. The impulses are initiated by a single-pole double-throw switch 227, Figure 12A, adapted to be actuated at a rate of four operations per second by a four-lobed cam 228 driven by a geared timer motor 229. The common pole 230 of the switch 227 is connected to ground 115, while the normally open contact 231 is connected via a lead 232 to the coil of a high-speed timing relay T. The second lead 233 of the relay T is connected through a resistor 234 to the —330 volt output of the power unit 183.

The relay T includes a normally open contact T2, shown near the bottom of Figure 12A, and adapted when closed to form a connection from ground 115 through one blade 235 of the manual switch 208 and either of two points 236 and 237 engaged thereby to the conductor 191. The latter conductor, as previously described, forms a connection through contact H1–1 of relay H1, Figure 12B, to the stepping switch solenoid S1S, which latter is connected in turn via a conductor 238 to the rectifier 226. It will be evident that as the relay T, Figure 12A, is actuated at a rate of four times per second by the cam operated switch 227, the successive closures, at that rate, of contact T2 complete the pulsing D. C. current from the rectifier 226 for actuating the stepping cycle in a manner equivalent to that of simplified Figure 11.

The relay T includes the normally open contact T1 shown also in Figure 10 and described in connection therewith as preventing the short-circuit detector relay M1 from closing during advance of the stepping switch wiper arms from point to point.

Referring again to Figure 12A, a branch 239 forms a connection between the ground conductor 232 of the relay T and the coil of an interrupter relay B, which latter is thus adapted to be connected to ground 115 at each closure of the switch contact 231 by the cam 228. The second coil lead 240 of relay B is connected through a resistor 267 to a conductor 242. The contacts M1–1, M2–1, M3–1, M4–1 and M5–1 of relays M1, M2, M3, M4 and M5 (previously pointed out in Figure 10) are connected in parallel between the conductor 242 and a common conductor 243 which in turn leads through the normally closed contact 207–1 of the reset switch 207 to the —330 volt supply.

The relay B is equipped with two normally open contacts B1 and B2. Contact B1 is adapted when closed to complete a holding circuit for both relay B and relay T, it being evident that due to the branch connection 239, opening of the cam-switch contact 231 will not remove ground 115 from the relay T while contact B1 is engaged. The second contact B2 is adapted to effect a connection from the 6.3 volt supply through a buzzer 244 and a normally closed contact 206–1 of the buzzer switch 206 to ground 115.

It has been noted with respect to Figure 10 that the relays M2, M3, M4 and M5 remain energized and relay M1 remains de-energized throughout the test cycle, provided no breaks or short-circuits are present in the network under test. Under these conditions, all the contacts M1–1, M2–1, M3–1, M4–1 and M5–1 remain open, preventing any energization of the relay B. However, if during the test cycle either a short-circuit or an improper break in the test network causes relay M1 to close or one or more of the other M relays to drop out, as previously explained, the closure of the corresponding M contact or contacts effects a connection to relay B from the —330 volt supply. Thereafter the next closure of the cam-switch contact 231 closes relay B including its holding contact B1. Thereby both relays B and T are locked in.

Since relay T is locked in as noted, its contact T2 cannot open its previously described D. C. circuit to whichever of the stepping switch solenoids (Fig. 12B) is in operation at the time. Consequently, this solenoid remains energized with steady D. C. current instead of impulses thereof, and bearing in mind that the stepping action can occur only on break of the solenoid current as explained concerning Figure 7, the corresponding stepping switch wiper remains stationary on the contact point through which the defect was detected.

The timer switch 227, Figure 12A, has a back contact 245 from which a conductor 246 leads to contacts M1–2, M2–2, M3–2, M4–2 and M5–2 of the relays M1, M2, M3, M4 and M5, these contacts being connected respectively through the signal lamps 212, 213, 214, 215 and 216 to a conductor 247 and thence by a branch 248, Figure 12B, to the un-grounded A. C. conductor 225. By this provision, when due to an encountered network defect, relay M1 drops in or any of the other M— relays drops out, bringing the cycle to a stop as described above, closure of the corresponding contact or contacts among the group M1–2, M2–2, M3–2, M4–2 and M5–2 directs pulsating current from the back timer contact 245 through the corresponding signal lamp or lamps, causing the latter to flash at the rate of the pulsations. Since drop-in of relay M1 results from a short-circuit defect, flashing of signal light 212 through the panel 118, Figure 8, indicates the presence of the short-circuit to the operator. Similarly, flashing of one or more of lamps 213, 214, 215, 216 indicates an improper open connection in the network under test, and since each lamp is related throught its corresponding M— relay to a particular level of the stepping switches as previously explained and as shown in Figure 12C, the levels in the network node between which the break exists are identified by the particular lamp or lamps flashing. At the same time the particular point of the particular stepping switch at which the defect is detected may be observed by means of the dials 217, 218, 219 or 220, Figure 8. A lamp 249, Figure 12A, may be provided under the operating panel 118, to facilitate observation of the dials.

From the foregoing description it will be seen that when a defect in the network tested brings the device to a stop, the operator is at once provided with data which enables him to identify the location and nature of the defect. For each type of network a chart of the terminal test connections is prepared when the master plug-board 146 is originally wired.

Thereafter, for example when a defect stops the device with lamp 212 flashing and with switch dial 218 stopped at point 37, the operator lists "short-circuit, switch 2, point 37," which data enables him at once to observe on the chart and hence on the network unit the particular node which is shorted. Similarly, if for further example stoppage occurs with lamp 215 flashing and switch dial 217 resting at point 41, the operator observes, "open connection, switch 1, level 4," which gives him the exact chart data for location of the break.

When a defect has been detected and it is desired to effect a repair, the timer motor 229 is turned off by means of the switch 210, Figure 8 and 12A. This switch 210 has a second contact pole 210a included in the common conductor path 180 which, when the contact A3 of relay A is closed, normally provides a current path from the resistors $R_x$, $R_y$, $R_z$, etc., Figure 12B, to the tube-control resistor $R_g$, Figure 12A, and thence to the —330 volt current supply. When the motor switch 210 is opened, opening of the latter's second pole contact 210a breaks the above current path, thus removing the test voltage from the resistors $R^x$, $R^y$, etc., their connected stepping switch contacts, and from the various network electrodes connected to the switch-points through the control panel 142 and receptor 119, Figures 3, 4 and 10. It will be understood that one of the elements of the test unit so deprived of voltage is the chassis frame 101 itself, which may be connected through the spring contact 137 and the control board 142 to any convenient test point in level 1 of switch S1, S2 or S3 in the same manner as described for the junction electrodes of the network. This arrangement permits the chassis frame to be tested in the same manner as the active network nodes for possible short-circuit to any of the latter.

The test voltage thus having been removed from the unit 100, the latter may be removed from the receptor 119, the defect repaired, and the unit 100 replaced, reconnected in the receptor, and the motor switch 210—210a re-closed.

During the above repair operation the stepping switches have remained in status quo, that is with one solenoid steadily energized due to the locked-in relays B and T as previously explained. To re-start the stepping operation, it is necessary to de-energize this solenoid in order to allow its cocked spring 159 (Fig. 7) to notch the corresponding wiper blades forward. This is accomplished by throwing the three-way switch 208, Figure 12A, to its left-hand "advance" position 250. The arm 237 of switch 208 disengages the central contact 236, breaking the ground connection to the conductor 191, which de-energizes the "cocked" solenoid and allows its associated stepping switch wipers to advance one step to their next respective contact points.

Thereafter, when the three-way switch 208 is returned to its central or running position as shown, and provided no further network break or short-circuit exists in connection with the stepping switch points reached by the single step advance noted above, the D. C. impulses are restored to the previously locked stepping solenoid to resume the automatic progress of the test as before.

In case for any reason during a run it may be desired to return the device to starting position, the reset switch contact 207–1 may be opened, thus preventing the relay B from closing to stop the device for any reason while the stepping switches complete their cycle to initial position.

During stoppage of the machine of eradication of network defects, it may be desired to silence the buzzer 244, which may be done by opening the contact 206–1 of the switch 206, Figures 8 and 12A. However, to prevent the possibility of accidentally carrying on the remainder of the test with the buzzer disconnected, the buzzer switch 206 is provided with a second pole 206–2 connected to conductor 191 and which, when the switch 206 is thrown to buzzer off position, engages a contact point 251 connected to the conductor 234. This effectively short-circuits the arm 235 and contact 236 of switch 208, preventing the movement of this switch to "advance" position from breaking the D. C. circuit between the conductor 234 and 191 until the buzzer switch 206 has been returned to normal position as shown in Figure 12A.

While failure of other components of the device would readily manifest themselves, if through failure of the tube 182 or associated elements of the short-circuit detecting circuit, the relay M1 should fail to operate properly, a test cycle might be performed without the detection of short-circuits actually existing in the tested network. It is therefore desirable to provide means to test this particular detecting combination itself. This means includes a second pole 252 of the three-way switch 208, connected to the conductor 234 and adapted to engage a contact point 253 when the switch 208 is swung to the right or "short test" position in Figure 12A. The point 253 is connected through two parallel resistors 254 and a branch 255 to the common conductor 180. The resistors 254 are each equal to one of the similar test resistors $R_x$, $R_y$, etc., so that their parallel resistance equals that of $R_x$ and $R_y$ in parallel. Accordingly, when the switch 208 is manipulated as noted, the first closure of relay contact T2 closes a circuit from ground through the resistors 254 to the common condutcor 180, establishing the same potential drop across resistor $R_g$ as that of Equation 3, i. e., simulating a short-circuit in a network being tested. If the tube 182, relay M1 and related parts are working properly, the system is stopped with indication of a short-circuit in the same manner as if an actual network short-circuit were encountered. This test may be carried out at any time during the operation of the device.

Referring to Figure 12B, it will be noted that the "test

"complete" lamp 209 is connected between the A. C. conductor 225 and the normally open contact H4-3 of relay H4, previously pointed out in Figure 11. When at the completion of the test cycle the relay H4 locks in and its contact H4-2 opens to drop out the master relay A, contact H4-3 closes to complete the connection of the lamp 209 to ground 115. The lamp 209 is thereby lighted to indicate completion of the cycle. When the relay A drops out, its contact A3, Figures 11 and 12A, opens to remove the test voltage from the receptor and tested unit.

The lamp 211, Figures 8 and 12B, is connected to the −330 volt supply whenever the holding contact A2 of relay A is closed, the lamp circuit being completed through a suitable resistor 256 to ground 115. This lamp indicates the presence of proper test voltage from the power unit throughout the test cycle. A second pole 206-2 of the reset switch 202 is adapted to short the contacts 185 and 187 of the starting switch 186 when thrown to reset position, preventing any possibility of dropping out the H and C relays by actuation of the starting switch 186 to start a new test cycle before returning the reset switch to "run" position.

Briefly summarized, the typical test procedure is carried out as follows:

The device is energized by means of the power switch 184, allowing the power unit 183 and tube 182 to warm up.

The unit 100 to be tested is placed in the receptor 119, engaging the bottom gang conductors 127, the upper plugs 135 and multiple connectors 128 and 129 are placed in engaged position as shown in Figure 3.

The motor switch 210, Figure 8, having been turned on, the operator momentarily depresses the starting switch 186, assuring the drop-out position of all the H and C relays and locking in the relay A. The machine thereupon starts its automatic cycle, the H and C relays locking in successively to transfer the square wave D. C. impulses from each stepping switch to the next. If no defect is present, the final actuation of relay H4 drops out relay A and turns on the "test complete" signal lamp 209. The motor turn-off and voltage-removal switch 210 is opened, the tested unit is removed from the receptor and the next similar unit installed therein for test in the same manner.

In case a defect is encountered during the test cycle the device stops, the buzzer 244 sounds, and either the short-circuit indicating lamp 212 or one or more of the break level indicating lamps 213, 214, 215 and 216 start flashing at the frequence of the D. C. impulses, in the present embodiment four flashes per second. The operator identifies and locates the defect by observation of the stepping switch dials 217, etc. and the flashing light or lights, opens the motor switch 210, removes the network defect, and re-starts the test by actuation of the "advance" switch 208 as previously described in detail. If a further defect is encountered the above-described procedure is repeated, until final completion of the test is signalled by the lamp 209.

As a variation of the above technique when a defect is encountered, instead of effecting the repair before continuation of the test the location and nature of the defect may simply be noted down, and test of the remaining network connections initiated at once by means of the "advance" switch 208 as above, in order to carry the test rapidly to completion. The tested unit may then be removed and all noted defects corrected at once. If desired, the repaired unit may be re-tested to check the soundness of the repairs.

It will be observed that in Figure 12B that the conductor affecting transfer of the square-wave current from the contact H1-2 to the contact arm 194 of the relay H2, while described in simplified Figure 11 as simple conductor 193, actually may include two plug-board jacks 151 connected by one of the plug-wires 153, Figure 5. Similar plug-wire connections may be provided in the transfer circuits from relay contact H2-2 to contact arm 194, and from relay contact H3-2 to contact H4-1. By this arrangement, when the device is to be used for testing networks having so few nodes as to have no need for the contact points of stepping switch S2, stepping switch S3, or both of them, the plug-board may be wired to eliminate one or both of these switches from the test cycle. For example, by omitting the plug-wires 153a and 153b and plug-wiring contact H1-2 directly to contact H4-1, the solenoids S2S and S3S can receive no current during the cycle. Consequently, the switches S2 and S3 are eliminated from the test cycle, which transfer directly from switch S1 to switch S4 in the manner illustrated in simplified Figure 10.

Included in the system are various resistors such as 259, Figure 12B, for limiting the voltage drop in their associated relays, etc., also various condenser-resistor combinations such as 260, Figure 12C, for reducing the tendency to arc at contact-breaks, but as these provisions are well known practice they need not be further described herein.

Figure 6:
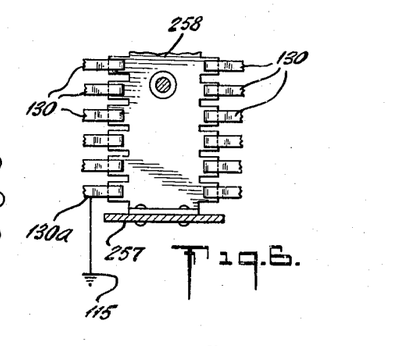
Figure 6 is a fragmental detail view of a means for grounding unused electrodes in the chassis receptor.

As previously pointed out, it is necessary that all unused contact points of the active selector switches be grounded, in order to avoid false indications of network open wiring, the grounding being provided for in the initial plug-board wiring. In the case of network units to be tested which do not occupy the full width of the receptor 119, the remaining space may be filled by a frame 257, Figure 6, which has a common contacting plate 258 electrically connecting a plurality of the receptor contacts 130 to one of their number 130a. This contact 130a, being grounded through the plug-board, furnishes ground 115 to all the other connected contacts, thus eliminating a large amount of additional plug-board wiring.

In the embodiment of the invention illustrated herein, in which the frequency of the stepping current is taken as four pulses per second and each of the four stepping switches include 52 contact positions, the time necessary to carry the test of a non-defective network through all four switches obviously is less than one minute, and this short time is further reduced in cases wherein one or more of the switches may be by-passed as explained above. Conversely, it is evident that for use with network including a very large number of nodes and electrodes, the device may be constructed to include as many more stepping switches as required, each equipped with it cooperative H and C relays and other related elements.

Similarly, while the receptor 119 is illustrated as constructed to accommodate the particular form of network unit 100, it obviously may be built in various forms to receive chassis networks of other shapes and types, the only prime requirement being that the junctions of the network be accessible to the receptor's contact members, which latter may be of any suitable type such as spring-pressed pins and the like as well as the spring fingers and socket pins illustrated. In other words, while the invention has been disclosed in preferred form, it is not limited to the exact structures or combinations illustrated, as various changes and modifications may be made without departing from the scope of the appended claims.

What is claimed is:

1. In a device for testing a circuit network having a a first node and a second node each including a plurality of normally connected junction electrodes, in combination, a pair of equal resistors, a common conductor connected to both said resistors, means to connect a first junction electrode of said first node through one of said resistors to said common conductor and to connect one of said electrodes of said second node through said second resistor to said common conductor, a common third resistor connected to said common conductor, a source of electric current, means to direct an electric current from said source through said first junction electrode of said first node and said first resistor and said common resistor in series whereby a normal voltage drop may be established across said common resistor, means to normally establish other electric currents respectively through all said other junction electrodes of said first node to said first junction electrode thereof simultaneously with said first established current, means controllable by increase in said voltage drop across said common resistor to indicate leakage of said first current between said first and second nodes and through said second resistor, and means controllable by failure of at least one of said other currents for indicating an open connection between said first junction electrode and at least one of said other junction electrodes of said first node.

2. The combination claimed in claim 1 wherein said leakage indicating means includes a vacuum tube having a control grid connected to and affected by the potential of said common conductor, said tube being biased so as to be non-conductive when said potential is at a value due to said normal voltage drop across said common resistor but to become conductive when said potential changes due to said increase in said voltage drop.

3. In a device for testing a circuit network having a plurality of normally electrically isolated nodes each including a plurality of normally connected junction points within a pre-determined upper numerical limit of said points per node, at least one of said nodes embodying more than two of said junction points, in combination, means including individual electrical contacts for each of said junction points and adapted to check simultaneously all the individual interjunctional connections of any one of said nodes including means to detect a break therein, means operable conjointly and simultaneously with said first checking means to check the electrical isolation of said node under test including means to detect a failure in said isolation, electrically operable means to apply said conjoint first and second checking means to all said nodes in normally timed cyclic succession, and common means controllable alternatively by said first and second detecting means upon detection of said break or said failure respectively to disable said applying means, whereby said cyclic application may be interrupted.

4. The combination claimed in claim 3 including signalling means operatively connected to said first detecting means to indicate the interjunctional location of said break, and signalling means operatively connected to said second detecting means for indicating said failure.

5. In a device for testing a circuit network including a plurality of nodes each comprising at least three normally interconnected junction electrodes, in combination, a supporting structure, a rotary stepping switch on said supporting structure including a plurality of structural levels each containing a plurality of successive contact points and a contact wiper, said wipers being adapted simultaneously to engage corresponding ones of said contact points in all their respective levels, a receptor on said supporting structure adapted to receive and removably hold said network, individual contact means in said receptor for engaging each of said junction electrodes of said network, means to establish electrical connections from single first junction electrodes of each of said nodes through said individual contact means to separate contact points intermediate the first and last points in the first level of said switch and to establish connections through said individual contact means from the other junction electrodes of each of said nodes to corresponding contact points in said other switch levels, a source of current, means connecting said wiper of said first switch level to one side of said source of current, a plurality of relays connected one each between the other side of said source and said other switch level wipers, whereby said wipers engaging a corresponding set of said switch contact points in all said levels may normally direct operative currents through said relays and through the network connectors between each of said other junction electrodes and said first junction electrode of said node connected to said corresponding set of switch contact points, electrically operable means to progressively advance said wipers to said other sets of corresponding contact points connected to said junction electrodes of said other network nodes, and means controllable by each of said relays upon failure of said operative current therethrough to disable said advancing means.

6. A device as claimed in claim 5 including a normally closed contact on each of said relays, and individual signalling means connected in series with each of said relay contacts and a source of current.

7. The combination claimed in claim 5 including a common conductor, a plurality of substantially equal resistors individually connected between said first level intermediate contact points of said stepping switch and said common conductor, means to direct an electric current independent of said relay currents through said first level switch wiper, said contact point engaged thereby, the one of said equal resistors connected to said engaged contact, said common conductor, and said common resistor, whereby a voltage drop may be established across said common resistor; a vacuum tube having a grid for controlling the plate circuit thereof, means forming plate circuit connections of said tube and including a detector relay, and means connecting said grid to said common conductor.

8. The combination claimed in claim 5 wherein said means for establishing said individual connections between said junction electrodes and said respective stepping switch contact points includes a control panel comprising a stationary contact board on said supporting structure and a plug-board cooperative with said stationary contact board and wired to pre-arrange said respective connections, said plug-board including said wiring being bodily removable from said supporting structure.

9. The combination claimed in claim 3 including auxiliary means operable in conjunction with said first and second checking means for checking the interjunctional connections of a node in said network embodying a number of junction points in excess of said pre-determined upper limit.

10. In a device for testing a circuit network including a plurality of nodes each comprising a plurality of normally electrically consolidated junction electrodes, at least one of said nodes embodying more than two of said electrodes, in combination, electrical means including an individual electrical contact for each junction of each of said nodes and adapted to simultaneously check all individual consolidating interjunctional connections of any one of said nodes, electrically operable means to apply said checking means to said nodes in normally timed cyclic succession, said checking means including means responsive to a break in any one of said interjunctional connections to disable said applying means whereby said successional application may be interrupted, and means operable conjointly and simultaneously with said checking means to detect a short circuit between any node under check and any of said other nodes of said network.

References Cited in the file of this patent

UNITED STATES PATENTS

| | | |
|---|---|---|
| 2,434,336 | Snook | Jan. 13, 1948 |
| 2,584,680 | Doncyson | Feb. 5, 1952 |
| 2,622,130 | Kabell | Dec. 16, 1952 |
| 2,762,014 | Anderson | Sept. 4, 1956 |